(12) United States Patent
Smith et al.

(10) Patent No.: US 6,212,242 B1
(45) Date of Patent: Apr. 3, 2001

(54) METHOD AND APPARATUS FOR TRANSMITTING COMMUNICATION SIGNALS USING TRANSMISSION SPACE DIVERSITY AND FREQUENCY DIVERSITY

(75) Inventors: David Anthony Smith, Guildford (GB); Håkan Gunnar Olofsson, Stockholm; Knut Magnus Almgren, Sollentuna, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/354,421

(22) Filed: Jul. 15, 1999

Related U.S. Application Data

(62) Division of application No. 08/665,501, filed on Jun. 18, 1996, now Pat. No. 6,006,075.

(51) Int. Cl.[7] .......................... H04L 27/04; H04L 27/12; H04L 27/20
(52) U.S. Cl. .......................... 375/299; 375/132; 455/101; 455/103; 455/562
(58) Field of Search .................................. 375/299, 295, 375/130, 132, 133, 135; 455/101, 103, 102, 560, 561, 562

(56) References Cited

U.S. PATENT DOCUMENTS

| 5,204,878 | 4/1993 | Larsson ................................. 375/14 |
| 5,282,250 | 1/1994 | Dent et al. ............................ 380/23 |
| 5,329,548 | 7/1994 | Borg .......................................... 375/1 |
| 5,404,374 | * 4/1995 | Mullins et al. ....................... 375/130 |
| 5,430,173 | 7/1995 | Gupta et al. ............................ 370/50 |
| 5,448,593 | * 9/1995 | Hill ....................................... 375/267 |
| 5,455,962 | * 10/1995 | Kotzin ................................. 455/33.1 |
| 5,638,372 | * 6/1997 | Lindqvist ............................. 370/336 |
| 5,663,990 | * 9/1997 | Boligiano et al. ................... 375/347 |
| 6,006,075 | * 12/1999 | Smith et al. ......................... 455/101 |
| 6,009,332 | * 12/1999 | Haartsen ............................. 455/450 |
| 6,031,883 | * 2/2000 | Sanderford, Jr. et al. .......... 375/344 |
| 6,034,987 | * 3/2000 | Chennakeshu et al. ............. 375/130 |

FOREIGN PATENT DOCUMENTS

| 0 364 190 A2 | 4/1990 | (EP) . |
| 0 622 911 A2 | 11/1994 | (EP) . |
| 0 213 780 A2 | 3/1997 | (EP) . |
| WO 93/20625 | 10/1993 | (WO) . |
| PCT/SE97/ 01044 | 12/1997 | (WO) . |

* cited by examiner

*Primary Examiner*—Chi Pham
*Assistant Examiner*—Jean B Corrielus
(74) *Attorney, Agent, or Firm*—Jenkens & Gilchrist, P.C.

(57) ABSTRACT

A transmitter diversity assembly and an associated method for a radio transmitter. When coupled to a radio transmitter to form a portion thereof, signal diversity is created to overcome multi-path fading. A plurality of antennas are freely selectable to be coupled to receive bursts of a communication signal, modulated to be transmitted on any of selected carriers. By altering the carriers upon which the bursts of the communication signal are transmitted and the spatially-separated antennas used to transduce the bursts of the communication signal, both transmission space diversity and frequency diversity is created.

18 Claims, 5 Drawing Sheets

| TIME INDEX n: | 1 | 2 | 3 | 4 | 5 | 6 | 7 | 8 | 9 | 10 | ... |
|---|---|---|---|---|---|---|---|---|---|---|---|
| FH PATTERN $F_n$: | 1 | 4 | 3 | 1 | 7 | 3 | 1 | 4 | 3 | 7 | ... |
| AH PATTERN $A_n$: | 1 | 2 | 3 | 2 | 3 | 1 | 3 | 2 | 3 | 1 | ... |

FIG. 8

METHOD AND APPARATUS FOR TRANSMITTING COMMUNICATION SIGNALS USING TRANSMISSION SPACE DIVERSITY AND FREQUENCY DIVERSITY

This Application is a Divisional of application Ser. No. 08/665,501 filed Jun. 18, 1996, now U.S. Pat. No. 6,006,075.

The present invention relates generally to apparatus and methods for overcoming multi-path fading of communication signals transmitted upon a communication channel susceptible to multi-path fading. More particularly, the present invention relates to a transmitter diversity assembly, and an associated method for creating signal diversity, such as transmission space diversity or frequency diversity, for a transmitter which transmits the communication signals upon the communication channel. The signal diversity created through operation of the assembly mitigates the effects of fading of the communication signals transmitted upon the communication channel.

The transmitter diversity assembly, and its associated method of creating signal diversity, is advantageously utilized, for example, at a base station of a cellular communication system. The transmitter diversity assembly, and its associated method, is advantageously utilized to create signal diversity both in a conventional cellular communication system which transmits analog communication signals and in a digital cellular communication system. When used at a base station of a digital cellular communication system, or at a transmitter of another digital communication system to create transmission space diversity, communication signal bursts are transmitted from different antennas of an antenna assembly, thereby to create the transmission space diversity. The transmission diversity assembly, and its associated method, is also advantageously utilized to create frequency diversity in conjunction with a communication system which utilizes a frequency hopping scheme. Use of the transmission diversity assembly to create both frequency and transmission space diversity further mitigates the effects of fading of the communication signals transmitted upon the multi-path channel.

BACKGROUND OF THE INVENTION

A communication system is formed, at a minimum, of a transmitter and a receiver interconnected by a communication channel. Communication signals generated by the transmitter are transmitted upon the communication channel to be received by the receiver.

A radio communication system is a type of communication system in which the communication channel is formed of a radio frequency channel. A radio communication system is advantageous for the reason that a fixed, or hardwired, connection is not required to form the communication channel extending between the transmitter and receiver. Communication can be effectuated between remotely-positioned transmitters and receivers without the need to form the hardwired or other fixed connections therebetween.

A cellular communication system is a type of radio communication system. When the infrastructure, hereinafter referred to as the network, of the cellular communication system is installed in a geographical area, a subscriber to the cellular system is generally able to communicate telephonically in the system when positioned at any location within the geographical area encompassed by the cellular network.

Technological advancements and economies of scale have contributed to lowered costs of communicating pursuant to a cellular communication system. Concomitant with the decreased costs of communicating pursuant to a cellular communication system has been an increase in usage of such systems. In some instances, conventional cellular communication systems have been operated at their maximum capacities. When operated at their maximum capacities, access is sometimes denied to additional users attempting to communicate pursuant to such systems. Ongoing calls are sometimes also adversely affected.

To avoid capacity problems and to permit an increase in the number of users permitted to utilize a cellular communication system, attempts have been made to increase the communication capabilities of such systems. To increase communication capacities, some conventional, cellular communication systems using conventional, analog technologies have been converted to digital, cellular communications systems which utilize digital coding and modulation technologies. Other radiotelephonic, and other communication systems, have been similarly converted.

Because digital communication systems generally utilize the radio frequency transmission channels upon which the communication signals are transmitted more efficiently, increased numbers of communication signals can be transmitted upon the radio frequency channels allocated for such communication systems.

By digitizing an information signal, which is modulated to form a communication signal, signal redundancies can be removed out of the information signal without affecting the amount of information transmitted in a communication signal formed therefrom. Also, once an information signal is digitized, a communication signal formed therefrom can be transmitted in discrete, discontinuous bursts. Two or more communication signals can thereby be multiplexed together and transmitted sequentially upon a single frequency channel. A twofold, or greater, increase in capacity is thereby possible when the communication system is converted into a digital communication system.

The communication signal transmitted upon a radio frequency channel is susceptible to scattering, diffraction, reflection, and attenuation. Signal reflection of the transmitted signal causes the signal actually received by a receiver to be the summation of signal components transmitted by the transmitter by way of, and some instances, many different paths, in addition to a direct, line-of-sight path.

The communication channel is sometimes referred to as a "multi-path channel," as the signal actually received by the receiver is the summation of a plurality of signal components transmitted to the receiver on a plurality of different paths. Values of the signal components transmitted upon the multiple numbers of paths are dependent, in part, upon their relative phases. Therefore, the value of the summation of the plurality of signal components received by the receiver is dependent upon the position at which the receiver is located when the signal is received. The receiver might be positioned such that signals transmitted on the plurality of signal paths add together destructively. Signal "fading" occurs when the signals add together destructively, and fading "dips" or "nulls" occur when the summation of the received signals results when such destructive addition makes difficult, or prevents, accurate determination of the informational content of the received signal.

Because fading deleteriously effects the quality of communications, attempts are sometimes made to mitigate the effects of fading. The deleterious effects of fading are particularly problematical in a cellular communication system when a subscriber unit operable to communicate therein is maintained in a stationary, or slowly moving, position. If positioned at an area in which a fading dip is significant, a significant amount of sequential information might be lost.

More particularly, various kinds of diversity are created at selected locations of the digital communication system to mitigate the effects of the multi-path fading. Time diversity, frequency diversity, receiver space diversity, and transmission space diversity are all types of diversity which can be created to mitigate the effects of multi-path fading.

When time diversity is created, signal bits of an informational signal are spread out, or interleaved together with other signal bits, over time, thereby to spread the bits over a time period. When interleaved or otherwise spread out over time, the likelihood that all of the bits are received at a receiver at a fading null is reduced. To be effective, the bit spreading requires that the fading nulls of the multi-path channel not last for significant time periods. If the nulls last for lengthy time periods, spreading out of the bits of the informational signal does not create diversity of levels effective to mitigate the effects of fading.

Receiver space diversity is also sometimes created. To create receiver space diversity, two or more receiver is antennas are positioned at two or more spaced apart positions, or at two or more different angles. The creation of receiver space diversity requires at least minimum physical separation distances between the receiver antennas. Such minimum separation distances cannot be provided at a subscriber unit operable in a cellular communication system due to the small size of the subscriber unit. Also, the conventional need for redundant receiver circuitry portion for each of the two or more receiver antennas is size-prohibitive in a subscriber unit which must be of minimal dimensions. Therefore, receiver space diversity sometimes cannot be utilized to create necessary levels of diversity to mitigate the effects of fading.

Frequency diversity is also sometimes created to minimize the effects of multi-path fading. Frequency hopping, i.e., transmitting bursts of a communication signal on carriers of different frequencies, spreads the communication signal over various frequencies. In a digital cellular communication system, such as the Group Special Mobile (GSM) communication system, an adequate level of frequency diversity is sometimes unable to be created as sometimes only a limited number, as few as, for instance, two, different carriers are available to transmit communication signals between a radio base station and subscriber unit. As multi-path fading is generally frequency-selective, the transmission of bursts of the communication signal on a different frequency carriers provides a diversity effect. However, the number of different frequency carriers upon which the bursts of the communication signal can be transmitted are sometimes limited. Such limitations limit the amount of frequency diversity which can be created.

Also, when successive carriers upon which successive bursts of a communication signal are transmitted are of similar fading characteristics, little frequency diversity is created. The coherence bandwidth is a frequency range which exhibits similar fading characteristics. When successive bursts of communication signals are transmitted upon carriers which are within the coherence bandwidth, little frequency diversity is created by such frequency hopping. If successive bursts of the communication signal are not transmitted on carriers within the same coherence bandwidth, communication quality degradation occurring as a result of multi-path fading is of less of a problem. Appropriate selection of the carriers upon which to transmit successive bursts of the communication signal would therefore advantageously better overcome the deleterious effects of multi-path fading.

Transmission space diversity is sometimes also created. To create transmission space diversity, two or more transmitting antennas are positioned at spaced-apart positions. In one manner of creating transmission space diversity, the same information is transmitted by each of the two or more transmitting antennas, but the information is transmitted at offset times. In another manner by which transmission space diversity is created, bursts of the communication signal are transmitted at only one antenna at a time, but shifting between the antennas occurs so that the bursts are transmitted sequentially to different ones of the antennas. Such a manner of creating the transmission space diversity is referred to as antenna hopping. Existing circuitry for creating transmission space diversity, however, does not typically provide for complete freedom of selection of antennas, particularly in instances in which statically-tuned transmitter elements are utilized to modulate the communication signal.

While the creation of receiver space diversity is impractical in the mobile subscriber units of a cellular communication system and similarly in some other communication systems, and while the creation of time diversity is sometimes unable to overcome the effects of multi-path fading, frequency and transmission space diversity can be created at a base site of a cellular communication system to overcome the effects of multi-path fading. Other communication devices of other communication systems which are susceptible to multi-path fading similarly can create frequency and transmission space diversity to overcome the deleterious effects of fading. Circuitry and methodology for a communication device which permits greater freedom in the creation of transmission space diversity and frequency diversity would be advantageous.

It is in light of this background information related to the creation of signal diversity to overcome the effects of multi-path fading that the significant improvements of the present invention have evolved.

SUMMARY OF THE INVENTION

The present invention advantageously provides a transmitter diversity assembly, and an associated method, which, during operation to transmit a communication signal, creates signal diversity to mitigate the effects of transmission of the communication signal on a multi-path, fading channel. The transmitter diversity assembly is utilized in conjunction with any of many different types of transmitters including transmitters operable to generate conventional, analog communication signals and those which generate digitally-encoded communication signals.

The transmitter diversity assembly and its associated method is advantageously utilized, for example, at a base station of a cellular communication system to create signal diversity in downlink signals transmitted by the base, station to mobile subscriber units. Bursts of the communication signals generated by transmitter circuitry of the base station are transduced by alternate ones of a set of spatially-separated antennas, thereby to create transmission space diversity.

In one aspect of the present invention, the communication signals are transmitted upon successive carriers in which selection of which of the carriers upon which to transmit successive portions of the communication signals is made responsive to transmission characteristics of the communication channels upon which the communication signals can be transmitted.

In another aspect of the present invention, the transmitter diversity assembly creates both frequency diversity and transmission space diversity. The communication signal generated at the base station is generated pursuant to a frequency hopping scheme to create diversity, and transmission space diversity is created through operation of a diversity antenna assembly. The frequency diversity created by the frequency hopping of the communication signal together further mitigates the effects of fading of the communication signal transmitted upon a multi-path communication channel.

In yet another aspect of the present invention, the transmitter diversity assembly forms a diversity antenna assembly which creates transmission space diversity. The diversity antenna assembly of an embodiment of the present invention and its associated method for creating transmission space diversity are particularly advantageously utilized when other manners by which to create diversity to mitigate the effects of multi-path fading are unavailable. For instance, in a cellular communication system, transmission space diversity is sometimes the only type of diversity which can be created to mitigate adequately the effects of multi-path fading. Receiver transmission diversity can sometimes not be adequately created at a subscriber unit due to the small dimensions of many subscriber units. Time diversity also sometimes can not be adequately created depending upon the fading characteristics of the multi-path channel upon which the communication signal must be transmitted, and sometimes frequency diversity cannot be adequately created due to the limited number of different carriers which might be available at a particular time.

The diversity antenna assembly provides a multi-antenna assembly. Communication signals are transduced by selected ones of the antennas when connected to transmitter circuitry which generates the communication signals. Switching between selected antennas of the antenna assembly is effectuated quickly and, in one embodiment, switching occurs at baseband frequencies. When used in conjunction with a frequency hopping scheme, selection of the antennas at which the communication signal is transduced is selected, in part, responsive to the frequency of the carrier upon which the communication signal is to be transmitted. Thereby, synergistic benefits of both transmission space diversity and frequency diversity are provided.

In these and other aspects, therefore, a transmitter diversity assembly, and an associated method of creating transmission space diversity, is provided for a communication station operable at least to transmit communication signals upon at least one communication channel. Antennas of a set of antennas are selectively coupled to the communication station to transduce the communication signals formed at the communication station. Switching circuitry is actuatable into selected switch positions for selectively coupling selected antennas of the set of antennas to the communication station to transduce the communication signals formed at the communication station. A selector is coupled to the switching circuitry. The selector determines transmission characteristics of the at least one communication channel and actuates the switching circuitry into the selected switch positions responsive to the transmission characteristics determined thereat.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
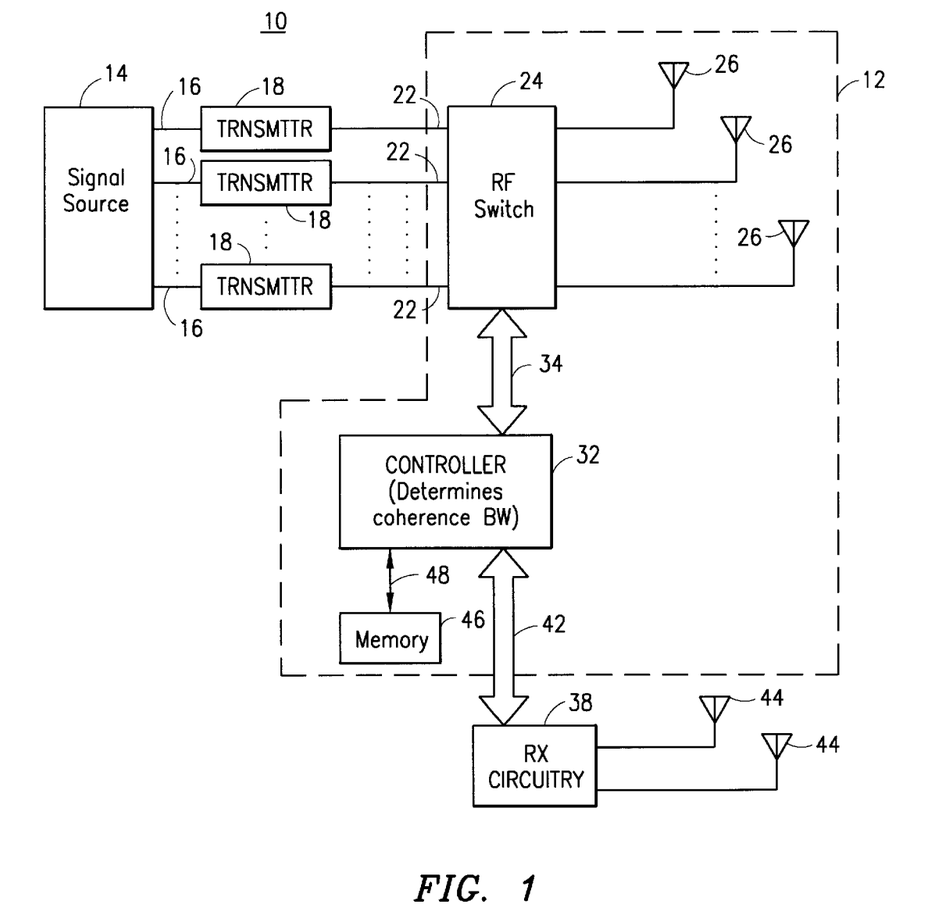
FIG. 1 illustrates a functional block diagram of a portion of a cellular communication system which includes an embodiment of the present invention.

Referring first to FIG. 1, a communication station 10, here a radio transceiver, is operable to transceive communication signals with a remote communication device (not shown). The communication station 10 includes a transmitter diversity assembly 12, formed of the elements positioned within the block shown in dash, of an embodiment of the present invention. The transmitter diversity assembly 12 is operable to create signal diversity of communication signals, hereinafter sometimes referred to as "downlink" signals, to overcome or otherwise mitigate the effects of multi-path fading of a communication signal during its transmission to the remote communication device.

In the illustrated embodiment, the transmitter diversity assembly 12 is operable to create both frequency diversity and transmission space diversity. As mentioned previously, frequency diversity is created by transmitting the communication signals upon carriers of different frequencies at different times, i.e., frequency hopping the communication signal. Transmission space diversity is created by transmitting the downlink signal, at different times, from different, spatially-separated antennas.

The communication station 10 includes a signal source 14, here shown in block form. In an embodiment in which the communication station 10 forms a base station of a cellular, communication system, the signal source 14 is representative of communication signals transmitted to the base station by way of, for example, a public service telephone network (PSTN). The signal source 14 forms the communication signal which is applied by way of a plurality of lines 16 to a plurality of single-frequency transmitter elements 18.

The transmitter elements 18 each modulate the communication signal applied thereto. Each of the transmitter elements 18 is tuned to a different frequency, i.e., are statically tuned, such that modulated signals modulated by the various transmitter elements are modulated to be of different frequencies. The modulated signals generated by the transmitter elements are applied, by way of lines 22, to first sides of a radio frequency (RF) switch 24. Second sides of the RF switch 24 are coupled to antennas 26. The antenna elements 26 are spatially-separated from one another. While three antenna elements 26 are illustrated in the figure, a set of antenna elements 26 formed of another number of antenna elements can instead be utilized.

The RF switch 24 permits connection of any of the lines 22 with any of the antenna elements 26, thereby to permit the communication signal modulated to be of any of the frequencies generated by any of the transmitter elements 18 together with any of the antenna elements 26. Connection of any of the transmitter elements with any of the antennas is freely selectable, i.e., a free mapping is permitted. Selection of the switch position of the RF switch 24 is controlled by a controller 32 which is connected to the RF switch 24 by way of lines 34. In one embodiment of the present invention, the switch positions of the RF switch 24 are switched through a selected sequence to connect successive ones of the transmitter elements 18 with successive ones of the antenna elements 26. The RF switch 24 may, for example, be formed of a switch matrix.

In the embodiment illustrated in the figure, the controller 32 is further coupled to receiver circuitry 38 by way of lines 42. The receiver circuitry 38 receives "uplink" signals transmitted to the communication station 10 from the remote communication devices. In a cellular communication system, the remote communication devices are formed of mobile subscriber units. Two receiver-diversity antennas 44 are illustrated in the figure to detect the uplink signals transmitted to the communication station. Indications of an uplink signal detected by an antenna 44 are provided to the controller 32 by way of the receiver circuitry 38 and the lines 42.

The controller 32, as shall be described in greater detail below, determines a coherence bandwidth of the communication channels formed between the communication station 10 and the remote communication devices. Responsive to the coherence bandwidth and previously-used carriers paired together with selected antenna elements, the controller selects the switch position into which the RF switch 24 should be actuated. Indications of previously-used carriers are stored in a memory element 46, coupled to the controller 32 by way of lines 48. In one embodiment, the carriers are selected according to a selected frequency hopping scheme. The antenna elements from which the communication signal is transmitted are selected for each carrier selected pursuant to the frequency hopping scheme. Selection of the antenna elements is made responsive to the coherence bandwidth and carrier and antenna element pairings made previously to transmit preceding portions of the communication signal.

Because the RF switch 24 permits any of the transmitter elements 18 to be coupled to any of the spatially-separated antennas 26, connection of any of the transmitter elements 18 with any of the antennas 26 is freely selectable. Bursts of the downlink communication signal modulated by any of the transmitter elements 18 can be transmitted from any of the antennas 26. The controller 32 is further used to select the carriers upon which to transmit the bursts of downlink signals. Such selections are responsive to the transmission characteristics of the channels formed between the communication station 10 and the remote communication devices, thereby to minimize the possibility that successive bursts of the downlink communication signal are transmitted upon carriers which exhibit high levels of multi-path fading.

In one embodiment, the RF switch 24 permits a plurality of different transmitter elements 18 concurrently to be coupled to a plurality of different antennas 26.

Figure 2:
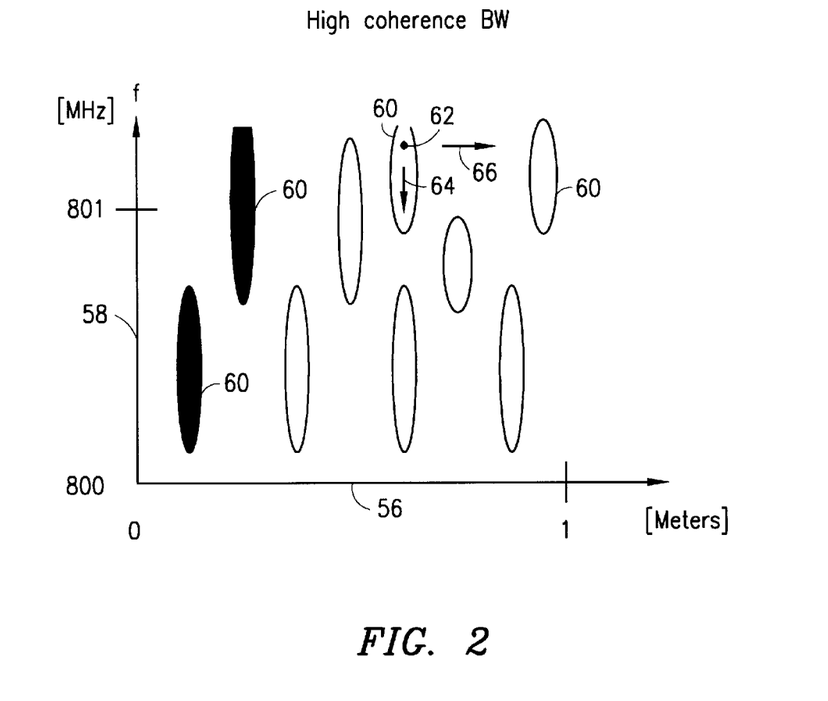
FIG. 2 illustrates a graphical representation which plots the fading pattern of an exemplary communication system which exhibits a high coherence bandwidth.

FIG. 2 illustrates graphically the characteristics of a communication system in which a high coherence bandwidth is exhibited and in which a low coherence space is exhibited. The abscissa axis 56 indicates positional locations, and the ordinate axis 58 indicates frequency. Elongated elliptical forms 60 are representative of areas which exhibit high levels of multi-path fading. Point 62 is representative of the fading characteristic at a particular frequency and at a particular location. Point 62 is positioned within an elliptical form 60. Therefore, communications between the two communication stations at the frequency and location identified by the point 62 exhibit significant levels of multi-path fading.

If the communication signals transmitted between such communication stations are transmitted on a different carrier located lower in frequency, indicated by the arrow 64, significant multi-path fading would still degrade the quality of the communication transmission. That is to say, by repositioning the point 62 in a direction indicated by the arrow 64, the communications will still exhibit high levels of fading, if the point is repositioned within the elliptical form. In the illustrated communication system which exhibits a high coherence bandwidth, significant levels of multi-path fading are exhibited over a large range of frequencies, resulting in the elongated ellipsis 60. Altering the position, as indicated by the arrow 66, however, removes the communications out of the area of high multi-path fading. In the illustrated communication system which exhibits a low coherence space, by repositioning the point 62 in a direction indicated by the arrow 66, the communication is repositioned beyond the elliptical form.

Figure 3:
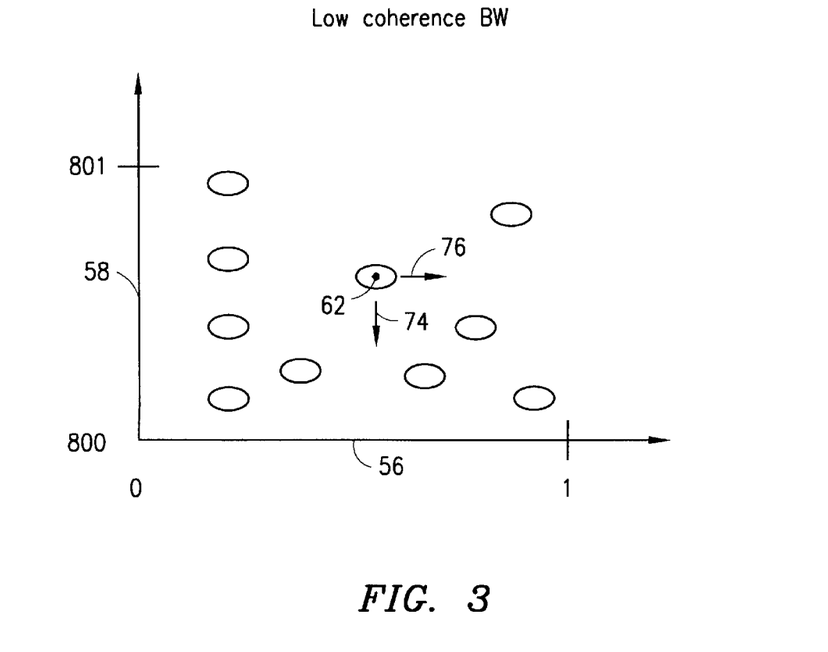
FIG. 3 illustrates a graphical representation, similar to that shown in FIG. 2, but of an exemplary communication system which exhibits a low coherence bandwidth.

FIG. 3, conversely, graphically represents a communication system which exhibits a low coherence bandwidth and which exhibits a coherence space similar to that shown in FIG. 2. The abscissa and ordinate axes 56 and 58 correspond to their correspondingly-numbered counterparts shown in FIG. 2. Here, areas of high levels of multi-path fading are represented by elliptical forms 70. In contrast to the elliptical forms 60 pictured in FIG. 2, the elliptical forms 70 are not elongated.

Communications represented by point 62 are again transmitted in an area which exhibits high levels of multi-path fading. In contrast to the high coherence bandwidth represented in FIG. 2, here alteration of the frequency channel in the direction indicated by the arrow 74 removes the communications out of the areas which exhibit high multi-path fading with a lesser amount of frequency change than that required in the communication system represented in FIG. 2. Again, altering the position, as indicated by the arrow 76, also removes the communications out of the area of high multi-path fading.

Transmission space diversity is created by moving the positional locations of the points 62 in the directions indicated by the arrows 66 and 76 shown in FIGS. 2 and 3, respectively. Analogously, frequency diversity is created by moving the frequencies of the points 62, in the directions, indicated by the arrows 64 and 74 shown in FIGS. 2 and 3, respectively.

In communication systems which exhibit a high coherence bandwidth, the creation of frequency diversity alone sometimes does not remove the communication out of an area which exhibits high levels of multi-path fading. In such instances, creation of both frequency and transmission space diversity is more likely to position the communications out of an area of high multi-path fading. In an embodiment of the present invention, therefore, the transmitter diversity assembly 12 creates both frequency and transmission space diversity, thereby best to overcome the effects of multi-path fading.

Figure 4:
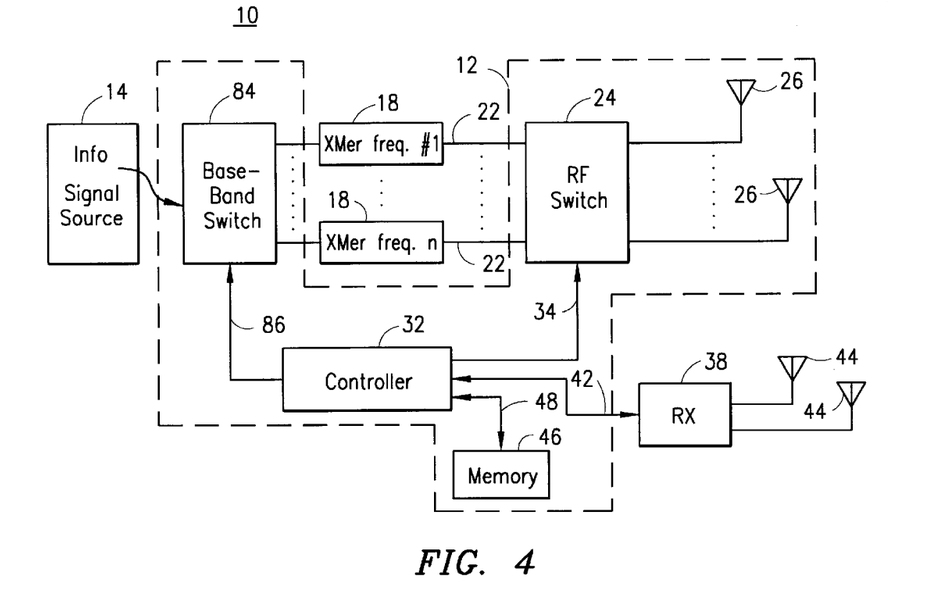
FIG. 4 illustrates a functional block diagram of a communication station which includes a transmitter diversity assembly of an embodiment of the present invention.

FIG. 4 illustrates a communication station, again shown generally at 10, which includes a transmitter diversity assembly 12 of another embodiment of the present invention. The communication station 10 again, for example, forms a base station of a cellular communication system. The transmitter diversity assembly 12 is again operable to create signal diversity of signals transmitted by the communication station.

In this embodiment, signals generated by a signal source 14 are selectively coupled by way of lines 16 to selected ones of the transmitter elements 18. A baseband switch 84 is positioned between the signal source 14 and the transmitter elements 18 to selectively connect the transmitter elements with the signal source. The transmitter elements 18 are again operable to modulate the communication signals applied thereto and to generate modulated signals on corresponding ones of the lines 22. The transmitter elements 18 are again operable to modulate the signals applied thereto at static frequencies. Because the baseband switch 84 selectively couples the communication signal generated by the signal source 14 only to selected ones of the transmitter elements 18, modulated signals are generated on only corresponding selected ones of the lines 22. The lines 22 are again coupled to first sides of an RF switch 24. The RF switch 24 may again form a switch matrix. Second sides of the RF switch 24 are coupled to antenna elements 26 of an antenna array wherein the antenna elements are spatially-separated from one another. Again, in one embodiment, a plurality of transmitter elements 18 can be concurrently coupled to a plurality of different antennas 26.

A controller 32 is again coupled to the RF switch 24 by way of lines 34. In this embodiment, the controller 32 is further coupled to the baseband switch 84 by way of lines 86. In this embodiment, the controller 32 is operable both to actuate the RF switch 24 into switch positions and also to actuate the baseband switch 84 into selected switch positions. Selection of the switch position of the baseband switch 84 is determinative of the carrier upon which a downlink channel is formed to transmit the signal generated by the communication station 10, and the switch position of the RF switch 24 is determinative of the antenna element 26 from which the downlink signal is transmitted.

Thereby, sequencing through switch positions of the baseband switch 84 creates frequency diversity and sequencing through switch positions of the RF switch 24 creates transmission space diversity.

In one embodiment, the switches 24 and 84 are actuated through selected sequences, such as repetitive sequences, to create both transmission space diversity and frequency diversity. In the illustrated embodiment, the selection of antenna elements upon which to transmit bursts of communication signals is made responsive, at least in part, to the coherence bandwidth of the communication channels extending between the communication station 10 and a remote communication device and antenna elements previously used to transmit preceding bursts upon particular carriers.

Again, the communication station 10 includes receiver circuitry 38 which is coupled by way of lines 42 with the controller 32. A receiver antenna element 44 detects uplink signals transmitted to the communication station 10. Indications of such received signals are provided to receiver circuitry 38 and, in turn, to the controller 32. The controller determines the coherence bandwidth, actuates the baseband switch 84 into a selected switch position responsive to a selected frequency hopping scheme. Previous switch positions of the baseband switch 84 stored in a memory element 46, coupled to the controller 32 by way of lines 48. The memory element 46 is further operable to store switch positions of the RF switch 24, and actuation of the switch 24 into selected switch positions is made, at least in part, responsive to previous switch positions of the switch and the determined coherence bandwidth.

Figure 5:
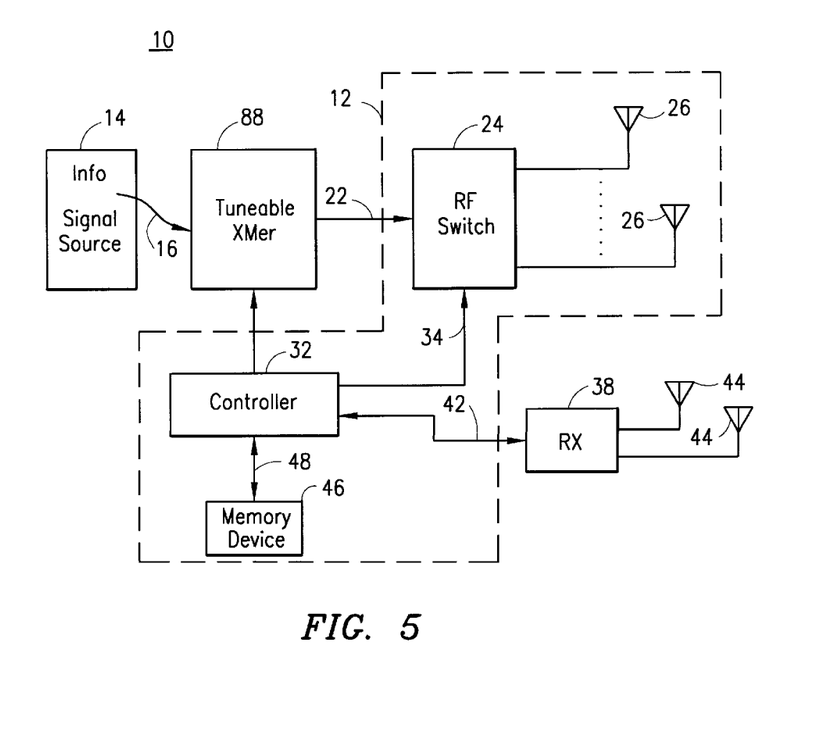
FIG. 5 illustrates a communication station which embodies a transmitter diversity assembly of another embodiment of the present invention.

FIG. 5 illustrates a communication station, again shown generally at 10 which includes the transmitter diversity assembly 12 of another embodiment of the present invention. The communication station 10, in one embodiment, again forms a base station of a cellular communication network operable to transceive communication signals with remotely-positioned mobile subscriber units. In other embodiments, the communication station 10 transceives communication signals with other remotely-positioned communication devices. The transmitter diversity assembly 12 is again operable to create signal diversity of downlink signals transmitted by the communication station.

Again, communication signals generated by a signal source 14 are applied to a transmitter element, here transmitter element 88. The transmitter element 88 is a tunable transmitter capable of modulating the communication signal at a desired frequency for transmission upon a particular carrier. Instead of a plurality of different transmitter elements 18, each operable to modulate a communication signal at a static frequency, the tunable transmitter element is tuned to the desired frequency of the carrier upon which the downlink signal generated by the communication station 10 is to be transmitted. The tunable transmitter element 88 generates a modulated signal on line 22 which is coupled to a first side of an RF switch 24. Second sides of the RF switch 24 are coupled to antenna elements 26 of an antenna array. The antenna elements 26 are spatially-separated from one another.

A controller 32 is again coupled to the RF switch 24 by way of lines 34 to actuate the RF switch 24 into selected switch positions. The controller 32 is further coupled to the tunable transmitter 88 by way of lines 92 to control the modulating frequency at which the tunable transmitter 88 modulates the communication signals applied thereto on line 22. As the controller 32 controls both the switch position of the RF switch 24 and the frequency at which the communication signal is modulated, both transmission space diversity and frequency diversity is created for downlink signals transmitted by the communication station 10.

In one embodiment, the controller actuates the RF switch 24 through a selected sequence of switch positions and tunes the tunable transmitter 88 through a selected sequence of modulating frequencies. In the illustrated embodiment, again, the communication station 10 further includes receiver circuitry, coupled to the controller 32 by way of lines 42. Uplink signals transmitted by a remote communication device to the communication station. Indications of uplink signals detected by a receiver antenna 44 coupled to the receiver circuitry 38 are provided to the controller 32 by way of lines 42. The controller, responsive to such indications, determines the coherence bandwidth. Responsive thereto and also responsive to previous switch positions of the switch 24 and previous carrier frequencies to which the tunable transmitter 88 is tuned, the controller 32 selects switch positions into which the RF switch 24 is to be actuated and modulating frequencies at which the communication signal is to be modulated. Again, a memory device 46 is utilized to store data related to previous switch positions of the switch 24 and modulating frequencies of the tunable transmitter 88, respectively.

Figure 6:
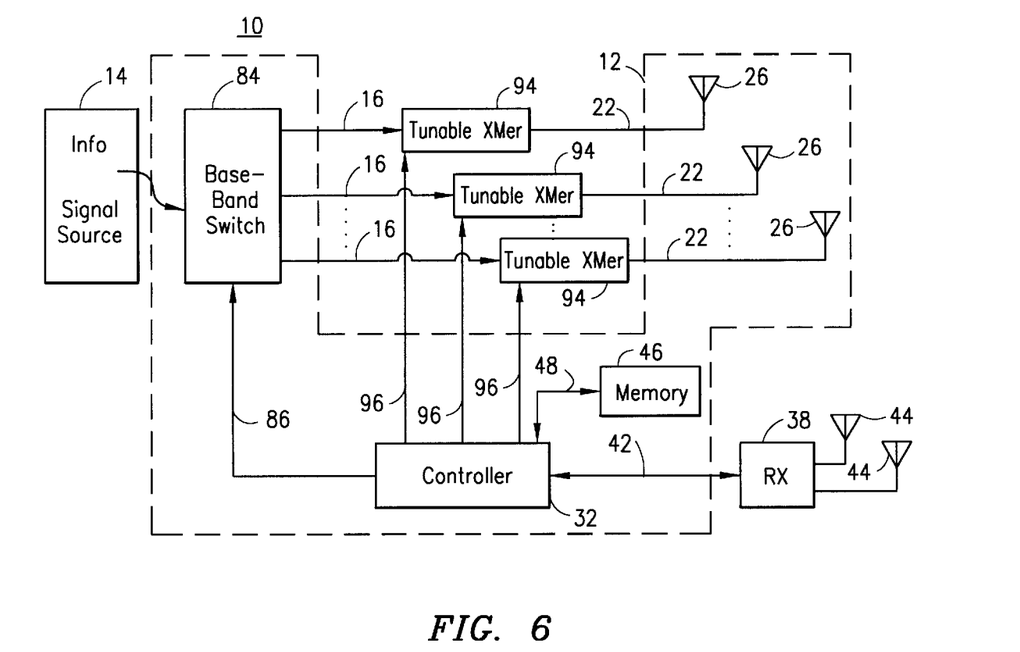
FIG. 6 illustrates a communication station which embodies yet another embodiment of the transmitter diversity assembly of the present invention.

FIG. 6 illustrates another communication station, again shown generally at 10, which includes a transmitter diversity assembly 12 of another embodiment of the present invention. In one embodiment, the communication station again forms a base station of a cellular communication system operable to transmit downlink signals to remotely-positioned, mobile subscriber units (not shown). In other embodiments, downlink signals are transmitted to other remotely positioned communication devices.

The transmitter diversity assembly 12 is again operable to create signal diversity of downlink signals transmitted by the communication station to overcome the effects of multi-path fading. Communication signals generated by a signal source 14 are applied to a first side of a baseband switch 84. The baseband switch 84 is operable, when positioned in selected switch positions to couple the communication signal generated at the signal source 14 to selected ones of the lines 16. Line 16 extends to respective ones of tunable transmitter elements 94. Each of the tunable transmitter elements 94 is tunable to modulate a communication signal, when applied thereto, at a desired modulating frequency corresponding to the carrier upon which the communication signal is desired to be transmitted. The communication signal, once modulated by a selected tunable transmitter 94, is generated on a corresponding line 22 extending to a particular antenna element 26 of an array of antenna elements. The antenna elements 26 are spatially-separated from one another.

A controller 32 is coupled to the baseband switch 84 by way of lines 86 and to each of the tunable transmitter elements 94 by way of lines 96. The controller selects the switch position into which the baseband switch is to be actuated, and effectuates actuation of the baseband switch into the selected switch position. Because each tunable transmitter element 94 is coupled to a particular one of the antenna elements 26, selection of the switch position of the baseband switch is determinative of the antenna element 26 from which the communication signal transmitted by the communication station 10 is transmitted.

The controller 32 further selects the modulating frequency at which the tunable transmitter elements coupled to receive the communication signal modulates the communication signal to be transmitted upon a selected carrier. Thereby, by appropriate selection of the switch position into which the baseband switch 84 is actuated and the modulating frequency at which an appropriate tunable transmitter element 94 modulates the communication signal, the carrier upon which the communication signal is transmitted and the antenna element 26 from which the communication signal is transmitted is appropriately selected. Transmission space diversity is created by actuating the baseband switch into successive switch positions, and frequency diversity is created by altering the modulating frequency at which the communication signal applied to appropriate ones of the tunable transmitters 94 are modulated.

Again, in one embodiment, the baseband switch is actuated through a selected pattern of switch positions and the tunable transmitter elements 94 are tuned to modulate the communication signal upon a selected sequence of carriers. In the illustrated embodiment, again, receiver circuitry is coupled to the controller 32 by way of lines 42 to receive indications of the uplink signals transmitted to the communication station by a remote communication device and detected by a receiver antenna 44. The controller determines the coherence bandwidth and selected ones of the tunable transmitter elements are caused to be tuned to the frequencies of selected carriers according to a frequency hopping scheme. The coherence bandwidth together with previous pairings of switch positions of the baseband switch and previous carriers upon which the communication signal has been transmitted are together determinative of selection of the switch position of the baseband switch 84 and also, therefore, the carrier frequency channel upon which the communication signal is transmitted. The memory device 46 coupled to the controller by way of lines 48 stores information related to such previous switch positions and previously-used carriers.

Figure 7:
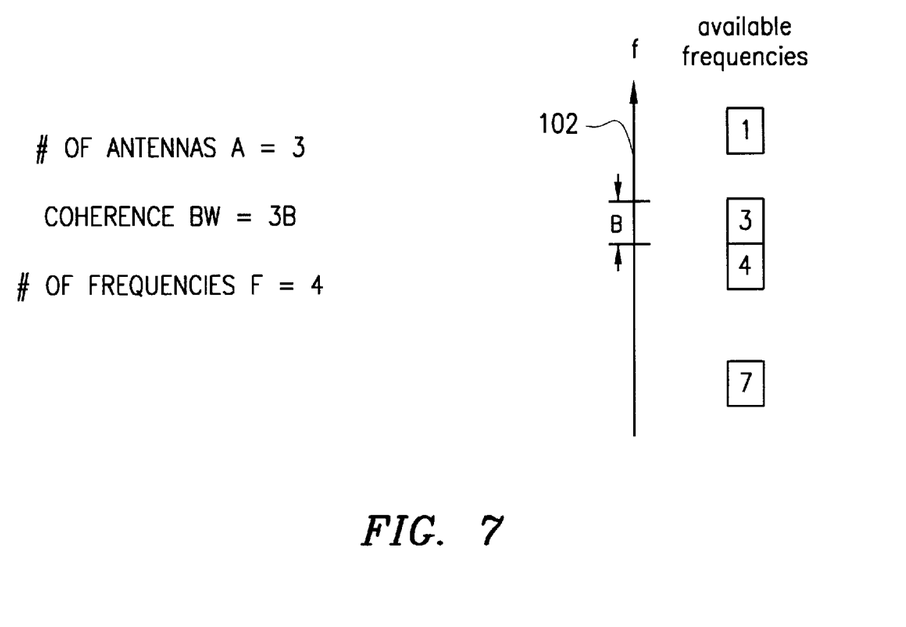
FIG. 7 illustrates an exemplary communication scheme utilizing frequency hopping.
Figure 8:
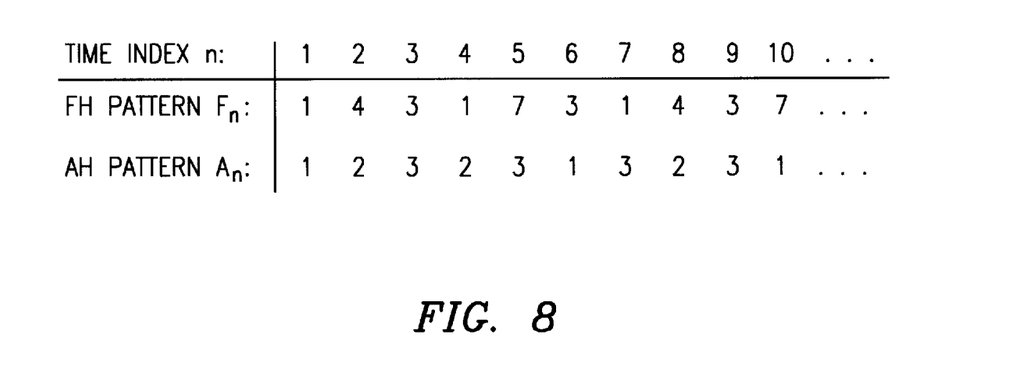
FIG. 8 illustrates a table which lists the antenna selections selected to transduce communication signals upon the frequency channels of the communication scheme illustrated in FIG. 7.

FIGS. 7 and 8 illustrate exemplary operation of the transmitter diversity assembly 12 of an embodiment of the present invention in which the assembly 12 is operable to create both transmission space diversity and frequency diversity. Creation of such signal diversity improves communication quality of communication in a communication system susceptible to multi-path fading.

The exemplary illustration of operation of the transmitter diversity assembly is that of a GSM, cellular communication system in which bursts of communication signals, here downlink signals, can be transmitted in bursts during selected time slots defined upon selected ones of a plurality of carriers. The carriers are of differing frequencies through a range of frequencies represented by the arrow 102. While a plurality of carriers are defined in the communication system, in the exemplary illustration, four carriers, here carriers of frequencies 1, 3, 4, and 7 are available for the transmission of downlink signals thereupon. In the illustration, also, three antennas 26 are available to be used to transduce the communication signals therefrom. And, the coherence bandwidth determined during operation of the diversity transmitter assembly is of a bandwidth of 3B wherein B is of a bandwidth corresponding to the bandwidth of one carrier. With a coherence bandwidth of 3B, any three adjacently-positioned, in frequency, carriers exhibit similar multi-path fading characteristics.

Through operation of an embodiment of the present invention, a selected frequency hopping scheme is used to select the carrier upon which a burst is transmitted. The antenna element selected to receive, and transduce, the burst is selected responsive to previous selections of antenna elements used previously to transmit bursts on carriers within the coherence bandwidth about the selected carrier.

FIG. 8 illustrates the pairing together of antennas, here antennas 1, 2, and 3 together with the available carriers, namely, carriers 1, 3, 4, and 7, shown in FIG. 7. That is to say, a communication signal burst is selected to be transmitted at a particular frequency and from a particular antenna. When "paired together" a burst of a communication signal is modulated to be of a frequency to permit its transmission on a selected carrier and the modulated signal is applied to its correspondingly paired antenna.

As the exemplary illustration of operation shown in FIG. 8 indicates, during a first time period, such as a first time slot of a first frame of a TDMA signal, such as that defined in the aforementioned GSM cellular communication scheme, a burst of the communication signal is modulated for transmission upon frequency channel 1 from antenna 1.

Selection of subsequent frequency channels and subsequent antennas to be used during succeeding time periods to transmit bursts of the communication signal are selected by: 1) observing which antennas have been used previously to transmit bursts on carriers within the coherence bandwidth about the selected carrier, and 2) selecting the antenna element for which the time since its latest use is the longest. If the utilization of a particular antenna is not mandated, the antennas are cyclically changed to create transmission space diversity.

Therefore, continuing with the exemplary operation illustrated in FIG. 8, during the second time period, time period 2, as no antennas have been previously used to transmit bursts of the communication signal within the coherence bandwidth around carrier 4, antenna 2 is selected to transmit the bursts during time period 2. During the third time period, time period 3, antenna 2 had previously been used to transmit a burst on carrier 4, within the 3B coherence bandwidth about carrier 3. Antenna 3 is selected to transmit the burst.

During the fourth time period, time period 4, the burst is to be transmitted upon carrier 1. As a burst was transmitted previously on antenna 1, during time slot 1, antenna 2 is selected. Selection of antennas and frequency channels used to transmit successive bursts of the communication signal are analogously selected.

With reference again to the communication station 10 shown in any of the FIGS. 1 and 4–6, in another embodiment, the controller 32 of the transmission diversity assembly 12 is operable at least either to alter the frequency channel upon which a downlink signal is transmitted to a remote station or the antenna from which the downlink signal is transmitted. In one such embodiment, the controller effectuates the alterations in an adaptive manner responsive to indications of channel characteristics applied as inputs to the controller. Such indications can be formed, e.g., characteristics of an uplink signal transmitted to the receiver 38 by a remote communication device or the remote communication device can provide information, as part of the uplink signal, of the characteristics of the communication signal transmitted directly on the downlink channels. In another embodiment, the controller causes such selection to be made in a prearranged manner.

Because the transmitter diversity assembly, and its associated method, creates signal diversity, use of the various embodiments of the present invention facilitate the communication of communication signals in a multi-path environment. Signal degradation which might otherwise occur as a result of multi-path fading is reduced, thereby to improve the quality of communications.

The previous descriptions are of preferred examples for implementing the invention, and the scope of the invention should not necessarily be limited by this description. The scope of the present invention is defined by the following claims.

What is claimed is:

1. A frequency hopping method for transmitting a communication signal generated at a communication station upon selected communication channels of a set of communication channels, said communication signal comprising a plurality of bursts, said method comprising the steps of:

selecting a first antenna from a set of antennas for a first burst;

determining a first frequency for said first burst;

transducing said first burst via only said first antenna and at said first frequency;

selecting a second antenna from said set of antennas for a second burst based, at least in part, on said first antenna;

determining a second frequency for said second burst based, at least in part, on said first frequency;

transducing said second burst via only said second antenna and at said second frequency; and wherein said steps of selecting a second antenna and determining a second frequency are further based, at least in part, on a history of antennas of said set of antennas and a history of frequencies via which and at which, respectively, said communication signal has previously been transduced.

2. The method of claim 1, wherein said first and second antennas of said set of antennas are spaced apart in order to create space diversity while transducing said communication signal.

3. The method of claim 1, wherein said first antenna comprises a first antenna array and said second antenna comprises a second antenna array.

4. A frequency hopping method for transmitting a communication signal generated at a communication station upon selected communication channels of a set of communication channels, said communication signal comprising a plurality of bursts, said method comprising the steps of:

selecting a first antenna from a set of antennas for a first burst;

determining a first frequency for said first burst;

transducing said first burst via only said first antenna and at said first frequency;

selecting a second antenna from said set of antennas for a second burst based, at least in part, on said first antenna;

determining a second frequency for said second burst based, at least in part, on said first frequency; and wherein a difference between said first and second frequencies approximately exceeds a coherence bandwidth in order to create frequency diversity while transducing said communication signal.

5. The method of claim 4, wherein said first antenna comprises a first antenna array and said second antenna comprises a second antenna array.

6. A frequency hopping method for transmitting a communication signal generated at a communication station upon selected communication channels of a set of communication channels, said communication signal comprising a plurality of bursts, said method comprising the steps of:

selecting a first antenna from a set of antennas for a first burst;

determining a first frequency for said first burst;

transducing said first burst via only said first antenna and at said first frequency;

receiving information regarding a fading characteristic of a communication channel corresponding to said first antenna and said first frequency;

selecting a second antenna from said set of antennas for a second burst based, at least in part, on said information regarding said fading characteristic;

determining a second frequency for said second burst based, at least in part, on said information regarding said fading characteristic;

transducing said second burst via only said second antenna and at said second frequency; and wherein said steps of selecting a second antenna and determining a second frequency are further based, at least in part, on a history of information regarding fading characteristics of at least one communication channel of said set of communication channels.

7. The method of claim 6, wherein said first and second antennas of said set of antennas are spaced apart in order to create space diversity while transducing said communication signal.

8. The method of claim 6, wherein said first antenna comprises a first antenna array and said second antenna comprises a second antenna array.

9. A frequency hopping method for transmitting a communication signal generated at a communication station upon selected communication channels of a set of communication channels, said communication signal comprising a plurality of bursts, said method comprising the steps of:

selecting a first antenna from a set of antennas for a first burst;

determining a first frequency for said first burst;

transducing said first burst via only said first antenna and at said first frequency;

receiving information regarding a fading characteristic of a communication channel corresponding to said first antenna and said first frequency;

selecting a second antenna from said set of antennas for a second burst based, at least in part, on said information regarding said fading characteristic;

determining a second frequency for said second burst based, at least in part, on said information regarding said fading characteristic; and wherein a difference between said first and second frequencies approximately exceeds a coherence bandwidth in order to create frequency diversity while transducing said communication signal.

10. The method of claim 9, wherein said first antenna comprises a first antenna array and said second antenna comprises a second antenna array.

11. A frequency hopping method for transmitting a communication signal generated at a communication station upon selected communication channels of a set of communication channels, said communication signal comprising a plurality of bursts, said method comprising the steps of:

selecting a first antenna from a set of antennas for a first burst;

determining a first frequency for said first burst;

transducing said first burst via only said first antenna and at said first frequency;

receiving information regarding a fading characteristic of a communication channel corresponding to said first antenna and said first frequency;

selecting a second antenna from said set of antennas for a second burst based, at least in part, on said information regarding said fading characteristic;

determining a second frequency for said second burst based, at least in part, on said information regarding said fading characteristic;

receiving at least one burst of said plurality of bursts of said communication signal on said communication channel at a remote communication station on a single antenna of said remote communication station;

determining a signal quality of said at least one burst; and transmitting said signal quality of said at least one burst from said remote communication station.

12. The method of claim 11, wherein said step of receiving information regarding a fading characteristic of a communication channel corresponding to said first antenna and said first frequency comprises the step of receiving said signal quality of said at least one burst that is transmitted from said remote communication station during said step of transmitting said signal quality.

13. The method of claim 11, wherein said first antenna comprises a first antenna array and said second antenna comprises a second antenna array.

14. A communication station for transmitting a communication signal upon selected communication channels of a set of communication channels, said communication signal comprising a plurality of bursts, comprising:

means for selecting a first antenna from a set of antennas for a first burst;

means for determining a first frequency for said first burst;

means for transducing said first burst via only said first antenna and at said first frequency;

means for selecting a second antenna from said set of antennas for a second burst based, at least in part, on said first antenna;

means for determining a second frequency for said second burst based, at least in part, on said first frequency;

means for transducing said second burst via only said second antenna and at said second frequency; and wherein said means for selecting a second antenna and said means for determining a second frequency are further operated based, at least in part, on a history of antennas of said set of antennas and a history of frequencies via which and at which, respectively, said communication signal has previously been transduced.

15. The communication station of claim 14, wherein said first and second antennas of said set of antennas are spaced apart in order to create space diversity while transducing said communication signal.

16. The communication-station of claim 14, wherein said first antenna comprises a first antenna array and said second antenna comprises a second antenna array.

17. A communication station for transmitting a communication signal upon selected communication channels of a set of communication channels, said communication signal comprising a plurality of bursts, comprising:

means for selecting a first antenna from a set of antennas for a first burst;

means for determining a first frequency for said first burst;

means for transducing said first burst via only said first antenna and at said first frequency;

means for selecting a second antenna from said set of antennas for a second burst based, at least in part, on said first antenna;

means for determining a second frequency for said second burst based, at least in part, on said first frequency; and wherein a difference between said first and second frequencies approximately exceeds a coherence bandwidth in order to create frequency diversity while transducing said communication signal.

18. The communication-station of claim 17, wherein said first antenna comprises a first antenna array and said second antenna comprises a second antenna array.

* * * * *

UNITED STATES PATENT AND TRADEMARK OFFICE
CERTIFICATE OF CORRECTION

PATENT NO. : 6,212,242 B1
DATED : April 3, 2001
INVENTOR(S) : Smith et al.

Page 1 of 1

It is certified that error appears in the above-identified patent and that said Letters Patent is hereby corrected as shown below:

Column 3,
Line 21, replace "two or more receiver is" with -- two or more receiver --

Column 14,
Line 1, replace "of said set of," with -- of said set of --

Signed and Sealed this

Twenty-ninth Day of January, 2002

Attest:

Attesting Officer

JAMES E. ROGAN
Director of the United States Patent and Trademark Office